Aug. 6, 1935.    W. C. GOSS    2,010,148
HYGROMETER
Filed May 25, 1931
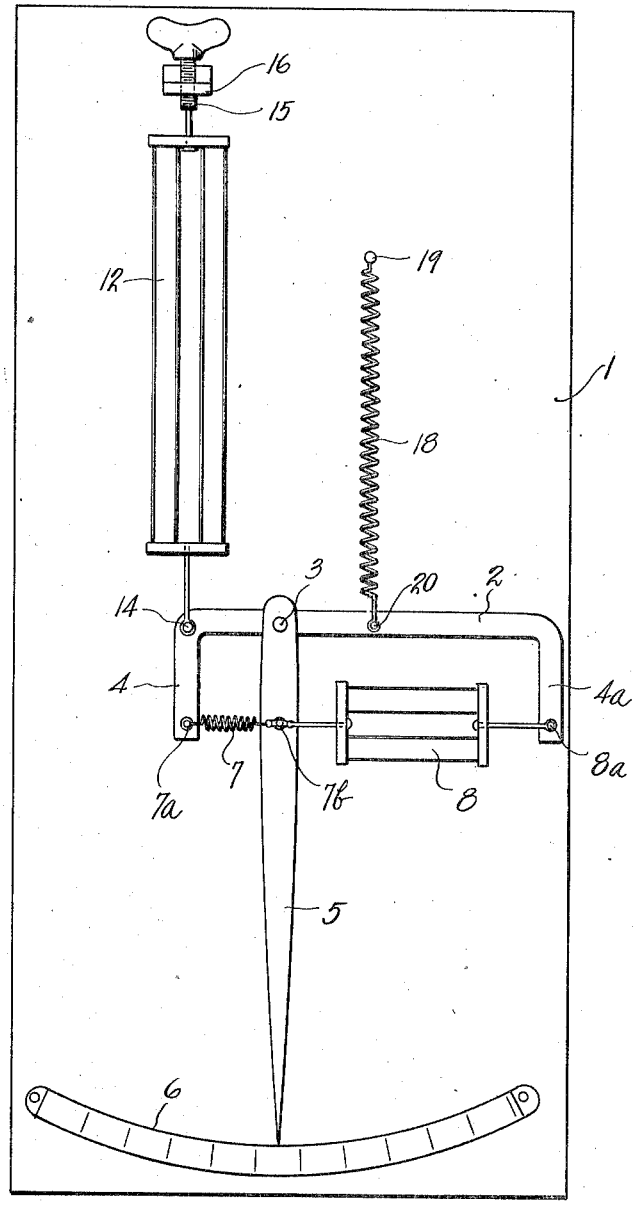
INVENTOR
WORTH C. GOSS
BY
Cook & Robinson ATTORNEY Patented Aug. 6, 1935

2,010,148

UNITED STATES PATENT OFFICE 2,010,148

HYGROMETER

Worth C. Goss, Seattle, Wash., assignor to Humidity Control Company

Application May 25, 1931, Serial No. 539,694

7 Claims. (Cl. 73—24)

This invention relates to indicators and it has reference particularly to improvements in indicators, controllers and the like, of that character now employed quite extensively for humidity control or for indicating changes in relative humidity of the atmosphere, and which in their construction employ a pointer, that is movable under the control of a hygroscopic material, which by reason of its physical characteristics or properties is caused to change form in accordance with the changes in relative humidity, and thus to move the pointer to indicate the extent of the change.

Explanatory to the invention, it will here be stated that indicating devices of the general character above outlined have proven to be very sensitive to changes in relative humidity and thus are very desirable, but by reason of the natural fatigue, or stretch of any hygroscopic material when under constant tension, soon become out of adjustment and must of necessity be carefully readjusted in order that they will be accurate to a reasonable degree. When such adjustment is not properly made, the instrument will not be accurate or dependable in its readings, and furthermore, there is always the uncertainty where a hygroscopic material is used, of not knowing whether or not the instrument is in or out of proper adjustment.

In view of the above, it has been the principal object of this invention to provide an indicator of the above character which may operate under the control of any suitable hygroscopic material such as a hair belt or the like, in the usual manner, but which includes additional means whereby the instrument is automatically maintained in accurate adjustment regardless of fatigue of the material.

More specifically stated, the invention resides in the provision of a compensating means for automatically readjusting to correct inaccuracies that would arise due to the fatigue in the hygroscopic material, so that after the instrument once is properly adjusted for use, practically no further adjustment or attention is required.

Other objects of the invention reside in the details of construction and combination of parts, as hereinafter described.

In accomplishing these and other objects of the invention, I have provided the improved details of construction, the preferred forms of which are illustrated in the accompanying drawing, wherein—

The single figure is an elevation of an indicator having an automatic adjustment embodied by the present invention.

It is thought well to here state that the present drawing is not intended to set forth a definite construction which must be followed in order to carry out the invention, but is for the purpose of illustrating the principle on which this invention is based and to show a construction that is satisfactory for carrying out the invention; it being understood that there may be modifications in form, size and in the proportion of the various parts used, so long as these changes do not cause a departure from the principle on which the device is based.

Referring more in detail to the drawing—
1 designates a base, frame or other suitable backing member for mounting the various parts of the instrument. Supported on this frame is a horizontal lever 2 supported for pivotal action by a pivot pin 3 that is fixed in the base 1. In the present instance the pivot pin 3 about which the lever 2 operates is disposed at a distance from one end of the lever which is approximately twice its distance from the other end and for convenience in the description the long and short end portions at opposite sides of the pivot will be referred to as the long and short arms of the lever.

At its opposite ends the lever has downwardly directed legs 4 and 4a which are slightly longer than the short arm above referred to.

A pointer 5 is extended downwardly from the pivot pin 3 and this is arranged to follow along an arcuate, graduated plate or strip 6 which is attached to the base member 1. A coiled spring 7 under tension connects with the lower end of the leg 4 at 7a and with the pointer at 7b which is at a predetermined distance below the pivot 3. Likewise, a belt 8 of hygroscopic material under tension connects at one end as at 8a with the leg 4a of the lever 2, and also with the pointer at 7b, so that the pointer, by reason of spring 7 and belt 8, will move about the pivot in accordance with the pivotal action of the lever, it being understood, however, that there is no fixed connection between the lever and the pointer at the pivot point, and there may be relative movement of one with respect to the other for compensating adjustment in the instrument.

It will be noted that the points of connection 7a and 7b of the opposite ends of the spring with the leg 4 and pointer 5, and the points of connection 7b and 8a of the opposite ends of the belt 8 with the pointer and leg 4a are in alignment and that this alignment is parallel with the lever 2, and that the connection retains the pointer substantially at a right angle to the lever 2.

In use of the device, the lever 2 is moved to adjust the position of the pointer 5, under control of a hygroscopic belt 12, which may be of any suitable material and of any suitable construction, and which is connected at its lower end, as at 14, to the outer end of the short arm of lever 2, at a point directly above the point of connection of the spring 7 with the leg 4 and at a distance from the pivot 3 corresponding in length to the distance from the pivot 3 to the point of connection 7b of the spring 7 and belt 8 with the pointer 5. The upper end of the belt 12 is attached to an adjusting screw 15, mounted in a supporting bracket 16 fixed to the base member 1. The pull of the belt 12 on this end of the lever is counterbalanced by the pull of a coiled spring 18 that is disposed parallel to the belt 12 and attached at its upper end to a fixed pin 19 and at its lower end to a pivot 20 in the lever 2 at a distance from the pivot 3 equal to the distance between the pivot 3 and connection 14.

Since I have employed a hygroscopic material in the instrument to compensate for error due to fatigue in the hygroscopic material which controls the action of the instrument, there must be a definite relationship in the belts themselves and springs used to counterbalance them. Also, it is very important to proper operation of the instrument that the two hygroscopic belts be of material or materials having identically the same characteristics and that the relationship of their lengths shall govern the relationship of the springs employed. For example, if the belt 8 is one-third the length of the belt 12, and both have the same physical characteristics, then the tension of the spring 7 shall be three times that of the spring 18. Likewise, if the belt 8 is one-half the length of the belt 12, the spring 18 shall have a tension equal to one-half that of the spring 7. It must be understood, however, that these requirements are based on an instrument in which the points of connection 7b—14 and 20 are at equal distance from pivot 3. A change in this condition would necessitate a compensating change in length of belts or tension of springs in order that the fatigue in belt 8 would automatically compensate for any error by reason of fatigue in belt 12.

To use the device as an indicator, it should first be adjusted to a standard or an accurate instrument. Then it is quite apparent that changes in relative humidity of the atmosphere will effect the belt 12 in a manner to permit movement of the lever 2 pivotally on its supporting pin 3 and thereby cause movement of the pointer 5 along the graduated scale plate 6 to indicate the changes in the relative humidity. Should the pointer 5 be rigidly fixed to the lever 2, it is obvious that its movement would be exactly in accordance with the movement of the lever 2, but in the present instance it is quite apparent that changes in relative humidity which affect the length of the belt 12 will likewise affect the length of the belt 8, and that the pointer will not move as far as it would if rigidly fixed to the lever. However, it must be remembered that the scale plate 6 is graduated in a manner to reckon with the changes permitted by reason of the belt 8 and therefore the readings will be just as accurate as if the belt 8 were not used.

In the present construction, any stretch or fatigue in the belt 12 is compensated for by reason of a corresponding fatigue in the belt 8. For instance, should the belt 12 under tension of spring 18 stretch a certain distance, the belt 8 under tension of spring 7 will stretch the same distance. Therefore, any inaccuracy of the instrument by reason of stretch in the belt 12 which would permit the pointer to swing farther toward the right hand side, would be compensated for in a corresponding stretching of belt 8 which would permit the pointer to swing toward leg 4 of the lever. This result is by reason of that definite relationship that exists between the two hygroscopic belts employed, the definite relationship in lengths of lever arms and a proper proportioning of spring tensions in accordance with the leverage and pull of the belts.

It is quite obvious that various arrangements other than that shown might be employed, therefore I do not wish to confine my claims only to that shown but desire that they shall apply to all modifications thereof so long as they employ an equivalent arrangement differing only in the proportioning of belts, springs or leverage.

Having thus described my invention, what I claim as new therein and desire to secure by Letters Patent is—

1. An instrument of the character described comprising a rocker having a supporting pivot, a spring and a hygroscopic belt connected in opposed relation to the rocker to control its action, a lever mounted to move on the pivot, a spring and a hygroscopic belt connected to the rocker and to the lever in opposed relation to cause the lever to swing on the pivot in accordance with movement of the rocker; said second mentioned hygroscopic belt being adapted to automatically effect adjustment of the lever relative to the rocker to compensate for movement of the rocker due to fatigue in the first mentioned belt.

2. An instrument of the character described comprising a lever pivotally mounted at a point intermediate its ends, a spring and a hygroscopic belt connected to the lever at opposite sides of the pivot in opposed relation and whereby movement of the lever is governed by the elongation or contraction of the hygroscopic belt, a pointer movable on the pivot free of the lever, a spring and a hygroscopic belt connected to the lever at opposite sides of the pivot and to the pointer in opposed relation and effecting movement of the pointer with the lever; said belts having identical characteristics and being under corresponding strain incident to their use whereby any movement of the lever by reason of fatigue of the first mentioned belt will be compensated for by a corrective movement of the pointer by reason of fatigue in the second belt.

3. An instrument of the character described comprising a lever having a pivotal support intermediate its ends, a spring connected to the lever at one side of the pivot, a hygroscopic belt connected to the lever at the other side of the pivot in opposed relation to the spring and whereby the lever is caused to move under control of the belt, a pointer mounted on the pivot to move freely of the lever and extended substantially at a right angle to the lever, a spring and hygroscopic belt connected to the pointer in opposed relation and to the lever to cause the pointer to move with the lever, said last mentioned belt being adapted, by elongation incident to fatigue, to permit movement of the pointer that will compensate for movement of the lever due to fatigue in the first mentioned belt.

4. An instrument of the character described comprising a horizontally disposed lever having downturned legs at opposite ends, a pivot pin supporting the said lever intermediate its ends, a spring attached to the lever at one side of the pivot, a belt of hygroscopic material attached to the lever at the other side of the pivot to oppose the pull of said spring, a pointer mounted on the pivot free of the lever and extended downwardly therefrom, a spring attached to the pointer and to that leg of the lever at the end to which the hygroscopic belt is attached, a belt of hygroscopic material attached to the other leg of the lever and to the pointer to oppose the tension of the second mentioned spring, the latter belt being shorter than that first mentioned and held under a tension that is such by reason of the connections that elongation due to fatigue in the belt will effect a corrective movement of the pointer relative to the lever that will compensate for movement of the lever due to fatigue in the first belt.

5. An instrument of the character described comprising a horizontally disposed lever having downturned legs at its opposite ends, a pivot pin supporting the lever at a point between its ends, a spring and a belt of hygroscopic material connected to the lever at equal distances from the pivot to oppose each other and to cause movement of the lever by reason of contraction or elongation of the belt, a pointer mounted on the pivot free of the lever and extended downwardly therefrom, a spring and a belt of hygroscopic material attached to the pointer at a distance from the pivot equal to the distance from the pivot to the point of attachment of the first spring with the lever, and connected respectively to the opposite legs of the lever to oppose each other and to cause movement of the pointer with the lever, the second mentioned belt having characteristics like that of the first but being of lesser length, and the tension of the first mentioned spring bearing the same proportion to that of the second as the length of the second belt is to the length of the first belt.

6. In an instrument of the character described, a movably mounted pointer, a yieldingly movable lever, a hygroscopic element associated under tension with the lever and operable to cause movement thereof in accordance with humidity changes, a hygroscopic element associated under tension with the lever and pointer whereby the pointer will be caused to move with the lever; the tension on the second hygroscopic element being such as to cause an elongation from fatigue with a resultant change in adjustment between the pointer and lever that will compensate for elongation of the first recited hygroscopic element from fatigue therein.

7. An instrument of the character described, comprising a pivoted lever, a hygroscopic belt connected under tension with the lever for moving it in accordance with changes of relative humidity; said belt being subject to elongation incident to fatigue caused by tension thereon, a movable pointer, and a second hygroscopic belt connected under tension with the lever and pointer and also subject to elongation by reason of fatigue resultant to tension thereon, the tension on the second belt being such that any movement of the pointer resulting from fatigue in the first mentioned belt is compensated for by relative adjustment of the lever and pointer due to corresponding fatigue in the second belt.

WORTH C. GOSS.